(12) United States Patent
Kim et al.

(10) Patent No.: US 11,088,878 B2
(45) Date of Patent: Aug. 10, 2021

(54) TRANSCEIVER USING MULTI-LEVEL BRAID SIGNALING AND METHOD OF OPERATING THE SAME

(71) Applicant: Korea University Research and Business Foundation, Seoul (KR)

(72) Inventors: Chulwoo Kim, Seoul (KR); Jonghyuck Choi, Suwon-si (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 16/932,217

(22) Filed: Jul. 17, 2020

(65) Prior Publication Data

US 2021/0211330 A1    Jul. 8, 2021

(30) Foreign Application Priority Data

Jan. 3, 2020 (KR) .................. 10-2020-0000962
Mar. 26, 2020 (KR) .................. 10-2020-0036930

(51) Int. Cl.
*H04L 25/02* (2006.01)
*H04L 5/00* (2006.01)
*H04L 1/00* (2006.01)

(52) U.S. Cl.
CPC ........ *H04L 25/0276* (2013.01); *H04L 1/0041* (2013.01); *H04L 1/0057* (2013.01); *H04L 5/0048* (2013.01)

(58) Field of Classification Search
CPC .. H04L 25/0276; H04L 1/0041; H04L 5/0048
See application file for complete search history.

(56) References Cited

U.S. PATENT DOCUMENTS

| | | | | |
|---|---|---|---|---|
| 6,812,733 B1* | 11/2004 | Plasterer | .......... | H03K 3/356104 326/115 |
| 7,477,849 B2 | 1/2009 | Ahmed et al. | | |
| 2001/0052807 A1* | 12/2001 | Vaucher | ............. | H03F 3/45937 327/157 |
| 2003/0011426 A1* | 1/2003 | Casper | ................ | H03F 3/45672 330/9 |
| 2005/0078712 A1* | 4/2005 | Voutilainen | ............... | H04L 7/06 370/516 |
| 2006/0290439 A1* | 12/2006 | Martin | .............. | H04L 25/03878 333/24.1 |

(Continued)

FOREIGN PATENT DOCUMENTS

| | | |
|---|---|---|
| JP | 2006-311446 A | 11/2006 |
| KR | 10-2005-0086790 A | 8/2005 |

(Continued)

OTHER PUBLICATIONS

Korean Office Action dated Jan. 5, 2021 in counterpart Korean Patent Application No. 10-2020-0036930 (7 pages in Korean).

(Continued)

*Primary Examiner* — Jaison Joseph
(74) *Attorney, Agent, or Firm* — NSIP Law

(57) ABSTRACT

A transceiver includes a transmitter modulating a data signal into code information in a modulation section unit and individually supplying a common mode current to a plurality of transmission lines and a receiver detecting the code information according to a voltage level of each of the transmission lines and outputting the data signal.

20 Claims, 14 Drawing Sheets

(56) References Cited

U.S. PATENT DOCUMENTS

| | | | | |
|---|---|---|---|---|
| 2007/0002954 | A1* | 1/2007 | Cornelius | H04B 3/04 |
| | | | | 375/257 |
| 2008/0034378 | A1* | 2/2008 | Kumar | G06F 13/4086 |
| | | | | 719/321 |
| 2012/0299618 | A1* | 11/2012 | Sayuk | H04L 25/0274 |
| | | | | 326/30 |
| 2016/0204768 | A1* | 7/2016 | Luo | H03K 3/012 |
| | | | | 327/108 |
| 2017/0111192 | A1* | 4/2017 | Shokrollahi | H04L 25/085 |
| 2017/0257168 | A1* | 9/2017 | Gopalakrishnan | H04L 7/0087 |
| 2018/0210239 | A1* | 7/2018 | Tatsumi | G02F 1/0327 |

FOREIGN PATENT DOCUMENTS

| | | |
|---|---|---|
| KR | 10-0630686 B1 | 10/2006 |
| KR | 10-0724576 B1 | 6/2007 |
| KR | 10-0955697 B1 | 5/2010 |
| KR | 10-2019-0083792 A | 7/2019 |
| KR | 10-2038831 B1 | 11/2019 |

OTHER PUBLICATIONS

Korean Office Action dated Jun. 9, 2021 in counterpart Korean Patent Application No. 10-2020-0036930 (7 pages in Korean).

* cited by examiner

| L | 0 | 1 | 0 | 0 | 0 |
|---|---|---|---|---|---|
| L | 0 | 1 | 0 | 0 | 0 |
| M0 | 1 | 0 | 1 | 0 | 0 |
| M0 | 1 | 0 | 0 | 1 | 0 |
| Output | Level-0 | Level-0 | Level-1 | Level-1 | Level-2 |

FIG. 11

TRANSCEIVER USING MULTI-LEVEL BRAID SIGNALING AND METHOD OF OPERATING THE SAME

CROSS-REFERENCE TO RELATED APPLICATION

This U.S. non-provisional patent application claims priority under 35 U.S.C. § 119 of Korean Patent Application No. 10-2020-0000962 filed on Jan. 3, 2020 and Korean Patent Application No. 10-2020-0036930 filed on Mar. 26, 2020, the contents of which are hereby incorporated by reference in its entirety.

BACKGROUND

1. Field of Disclosure

Embodiments of the present disclosure relate to a transceiver using a multi-level braid signaling and a method of operating the same.

2. Description of the Related Art

As the structure of electronic products is becoming more complicated to meet the needs of consumers, the electronic products include a plurality of electronic components. A signal processing device processes signal transmission and reception between the electronic components.

For example, the electronic products, such as a television set, a monitor, a smartphone, or the like, include the signal processing device as an intra-panel interface that connects a display panel and a timing controller.

The signal processing device includes a transmitter, a receiver, or both the transmitter and the receiver. The transmitter and the receiver read data provided thereto based on a clock signal that is aligned or known between them in advance.

Most conventional signal processing devices transmit the clock signal after adding dummy bits to data, however, this technique inevitably causes a loss of transmission bandwidth due to the use of dummy bits.

In addition, among conventional techniques, a method of transmitting the clock signal using a PAM method rather than a digital method causes a loss of noise margin.

Further, among conventional techniques, a differential transmission method has effects of reducing EMI, providing a large noise margin, providing a regression path, and minimizing simultaneous switching noise, however, the differential transmission method also has a disadvantage in that the number of types of signals that are transmittable is small considering the number of signal lines that are required.

SUMMARY

The present disclosure provides a transceiver and a method of operating the same, which modulate a data signal in the unit of a modulation section, improve a transmission bit rate, and uniformly maintain a common-mode level for a plurality of transmission lines.

Embodiments of the inventive concept provide a transceiver including a transmitter modulating a data signal into code information in a modulation section unit and individually supplying a common mode current to a plurality of transmission lines and a receiver detecting the code information according to a voltage level of each of the transmission lines and outputting the data signal.

Embodiments of the inventive concept provide a method of operating a transceiver. The method includes modulating a data signal into code information in a modulation section unit to supply a common mode current to a plurality of transmission lines using a transmitter and detecting the code information according to a voltage level of each of the transmission lines to output the data signal using a receiver.

According to the above, the transceiver and the operating method of the transceiver may improve the transmission bit rate, may uniformly maintain a common-mode level for the of transmission lines, and may reduce output noise.

In addition, since the data signal may be output using a parallel connection relationship between the transmission lines, a separate analog reference voltage is not needed.

BRIEF DESCRIPTION OF THE DRAWINGS

The above and other advantages of the present disclosure will become readily apparent by reference to the following detailed description when considered in conjunction with the accompanying drawings wherein:

FIG. 11 is a data table that is processed by a sampler of FIG. 10; and

DETAILED DESCRIPTION

Figure 1:
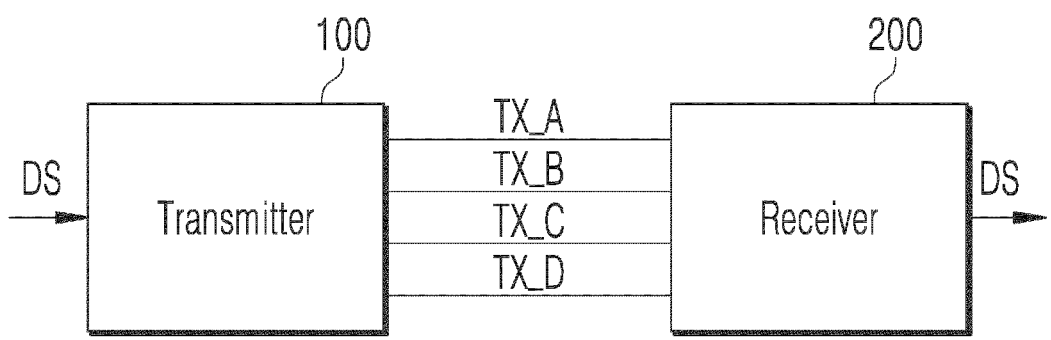
FIG. 1 is a block diagram showing a transceiver according to an exemplary embodiment of the present disclosure.

Hereinafter, exemplary embodiments of the present disclosure will be explained in detail with reference to the accompanying drawings. However, embodiments of the present disclosure may be modified in various other forms, and the scope of the present disclosure should not be limited to the embodiments described below. In addition, embodiments of the present disclosure is provided to more completely describe the present disclosure to those skilled in the art. Accordingly, the thickness, ratio, and dimension of components in the drawings may be exaggerated for effective description of the technical content, and like numerals refer to like elements throughout.

In order to clearly illustrate the present disclosure in the drawings, parts not related to the description are omitted, thicknesses are enlarged to clearly illustrate various layers and regions, and components having the same function within the scope of the same idea are described using the same reference numerals. Further, throughout the present disclosure, when a part is referred to "include" a certain component, it is understood that it further includes other components, without excluding other components unless specifically stated otherwise.

Figure 2A:
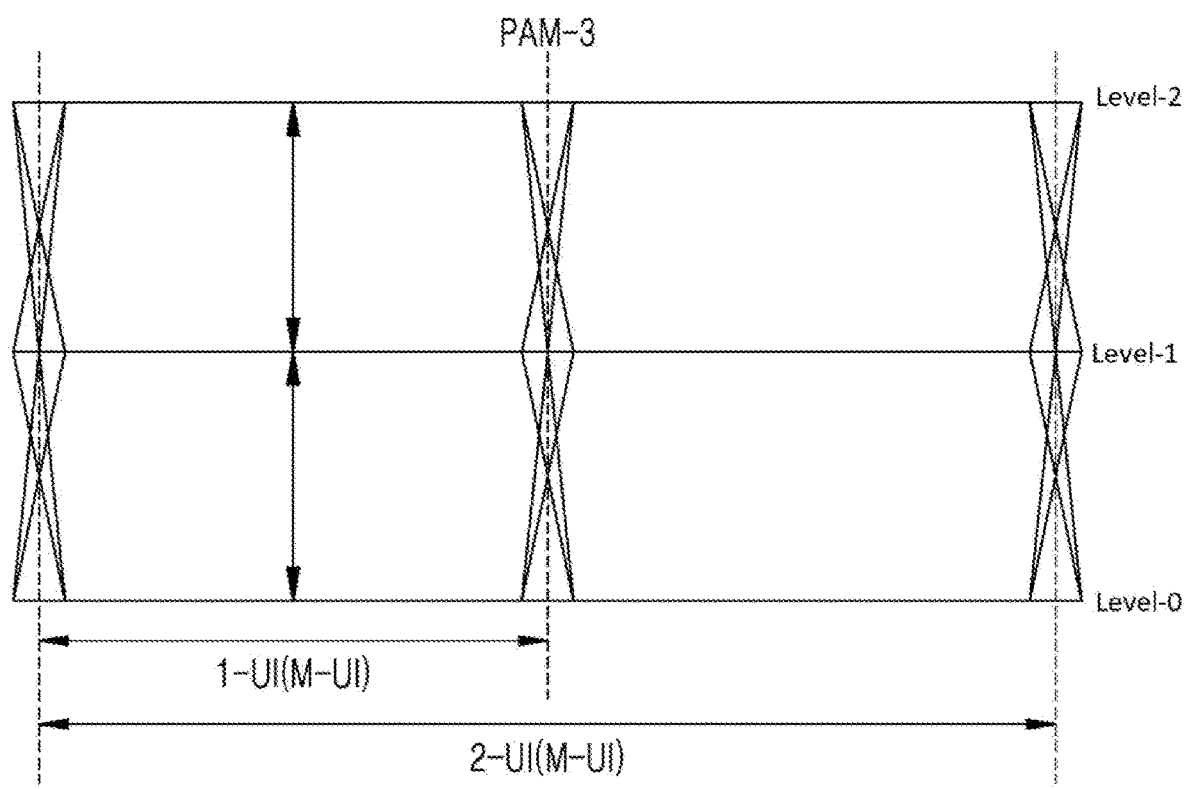
FIGS. 2A and 2B are views showing a modulation section unit.
Figure 2B:
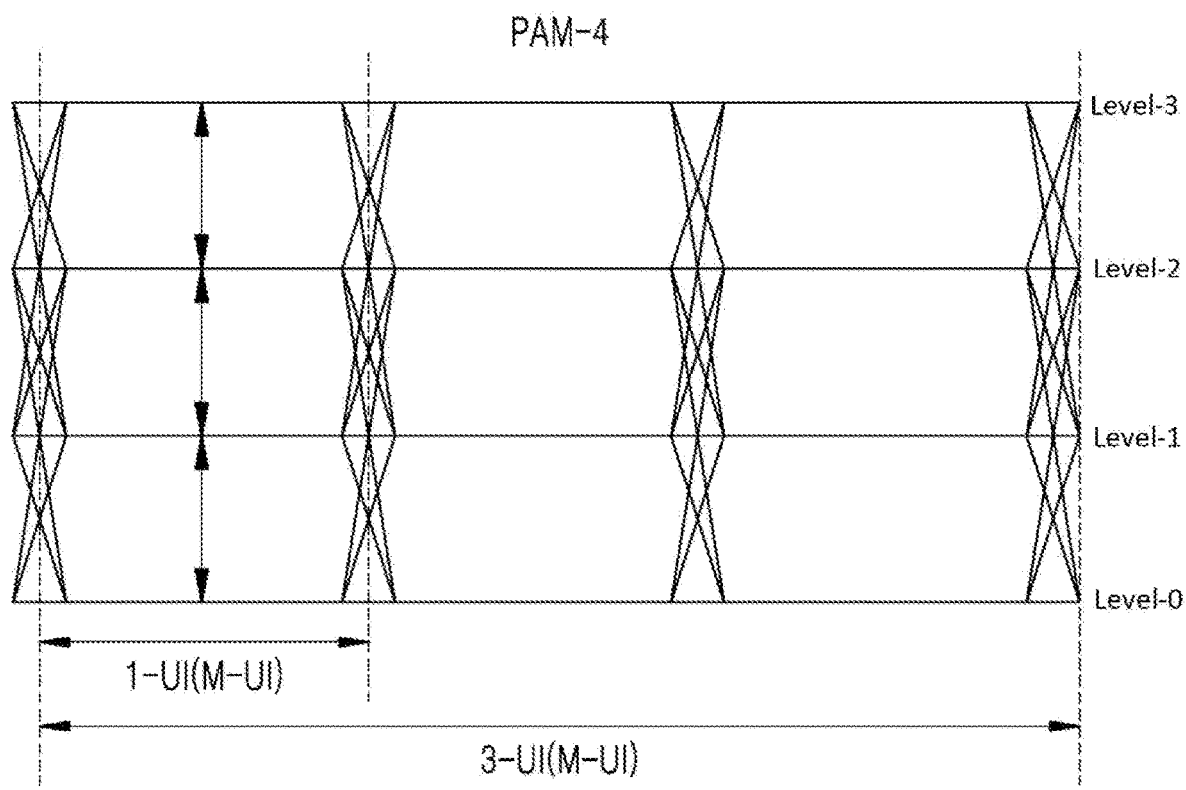
Figure 3A:
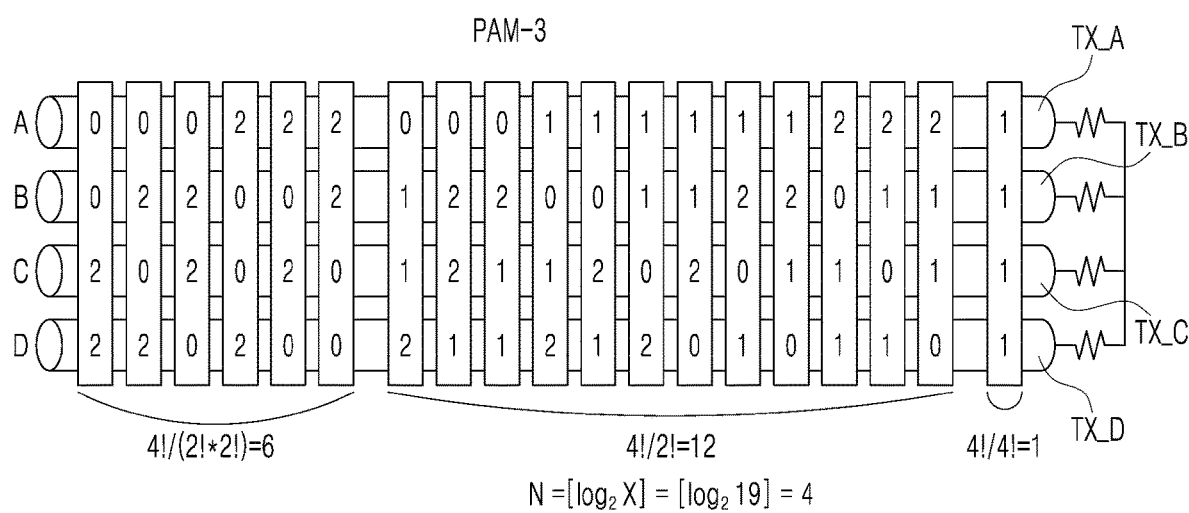
FIGS. 3A to 3C are views showing the number of modulation codes that are previously mapped according to a parallel connection relationship between a plurality of transmission lines.
Figure 3B:
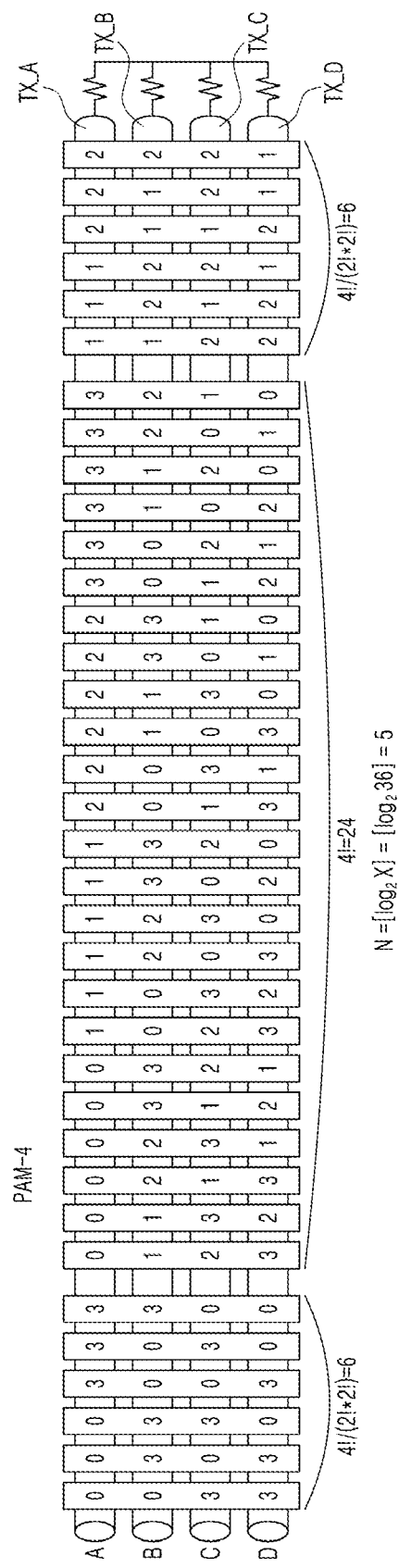
Figure 3C:
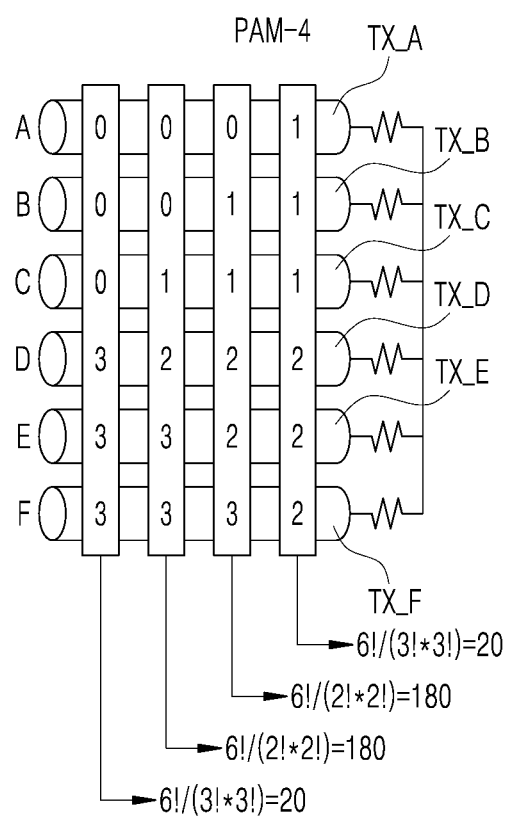

FIG. 1 is a block diagram showing a transceiver 10 according to an exemplary embodiment of the present disclosure, FIGS. 2A and 2B are views showing a modulation section unit M-UI, and FIGS. 3A to 3C are views showing a plurality of modulation codes that are previously mapped according to a parallel connection relationship between a plurality of transmission lines.

Referring to FIG. 1, the transceiver 10 may include a transmitter 100 and a receiver 200.

The transmitter 100 may modulate a data signal DS into code information ABCD in the modulation section unit M-UI.

In this case, the modulation section unit M-UI may include at least two modulation time units 1-UI and may be an integer multiple (M) of the modulation time unit 1-UI. For example, as shown in FIG. 2A, the modulation section unit M-UI may be two modulation time units 2-UI that are two times greater than the modulation time unit 1-UI. In addition, as shown in FIG. 2B, the modulation section unit M-UI may be three modulation time units 3-UI that are three times greater than the modulation time unit 1-UI.

In addition, the code information ABCD may include modulation codes having different code arrangements for each modulation section unit M-UI to ensure data transition. For example, the code information ABCD may include the modulation codes having different code arrangements, such as '0202', '2020', or the like, for each two modulation time units 2-UI, e.g., the modulation section unit M-UI.

Since the code information ABCD include the modulation codes having different code arrangements for each modulation section unit M-UI, the transmitter 100 does not need to provide a separate clock signal to ensure the data transition, and the receiver 200 may perform an automatic speed tracking operation for the code information ABCD.

In addition, the data signal DS modulated for each modulation section unit M-UI may be in proportion to the number of the modulation codes that are previously mapped according to the parallel connection relationship between the transmission lines as in the following Equation 1.

In the present exemplary embodiment, Equation 1 is $N=\lfloor \log_2 X \rfloor$. In Equation 1, "N" denotes the number of bits of the data signal DS, and "X" denotes the number of the modulation codes that are previously mapped according to the parallel connection relationship between the transmission lines.

For example, as shown in FIG. 3A, when the number of the modulation codes that are previously mapped according to the parallel connection relationship between the transmission lines is 19, the data signal DS modulated for each modulation section unit M-UI may be 4 bits. As another example, when the number of the modulation codes that are previously mapped according to the parallel connection relationship between the transmission lines is 36, the data signal DS modulated for each modulation section unit M-UI may be 5 bits.

In this case, the transmission lines may be at least two or even numbers, and all the transmission lines may be connected to each other in parallel. The number X of the modulation codes that are previously mapped according to the parallel connection relationship between the transmission lines may be greater than the number of modulation codes that are previously mapped according to a conventional differential relationship in which each pair of the transmission lines of the transmission lines is connected in parallel.

That is, the transmission bit rate of the data signal DS that is in proportion to the number of the modulation codes that are previously mapped according to the parallel connection relationship between the transmission lines TX_A to TX_D may be greater than a transmission bit rate of a conventional data signal DS.

In addition, the data signal DS modulated for each modulation section unit M-UI may be in proportion to the number of the modulation codes that are previously mapped according to the parallel connection relationship between the transmission lines and the modulation section unit M-UI as in the following Equation 2.

In the present exemplary embodiment, Equation 2 is $N=\lfloor M^* \log_2 X \rfloor$. In Equation 2, "N" denotes the number of bits of the data signal DS, and "X" denotes the number of the modulation codes that are previously mapped according to the parallel connection relationship between the transmission lines and denotes the number of the modulation time units 1-UI of the modulation section unit M-UI.

The number of the modulation codes that are previously mapped according to the parallel connection relationship between the transmission lines TX_A to TX_D may be varied according to a multi-level signaling scheme.

In the present exemplary embodiment, the multi-level signaling scheme may be a signaling protocol using N voltage levels. For example, an NRZ signaling scheme may be a signaling protocol using two voltage levels, a PAM-3 signaling scheme may be a signaling protocol using three voltage levels, and a PAM-4 signaling scheme may be a signaling protocol using three voltage levels.

For example, as shown in FIG. 3A, when the multi-level signaling scheme is the PAM-3, the number of the modulation codes that are previously mapped according to the parallel connection relationship between the transmission lines TX_A to TX_D may be about 19. In addition, as shown in FIG. 3B, when the multi-level signaling scheme is the PAM-4, the number of the modulation codes that are previously mapped according to the parallel connection relationship between the transmission lines TX_A to TX_D may be about 36.

In this case, the number of the modulation codes that are previously mapped according to the parallel connection relationship between the transmission lines TX_A to TX_D may be in proportion to the number of the transmission lines TX_A to TX_D.

For example, as shown in FIG. 3C, when the number of the transmission lines TX_A to TX_F is 6 and the multi-level signaling scheme is the PAM-4, the number of the modulation codes that are previously mapped according to the parallel connection relationship between the transmission lines TX_A to TX_F may be about 400.

In addition, the transmitter 100 may individually provide common mode currents to each of the transmission lines TX_A to TX_D. In detail, the transmitter 100 may provide individually the common mode currents to each of the transmission lines TX_A to TX_D, when the data signal DS is modulated into the code information ABCD.

Then, the receiver 200 may detect the code information ABCD based on a voltage level of each of the transmission lines TX_A to TX_D and may output the data signal DS.

In the present exemplary embodiment, the code information ABCD may respectively correspond to the voltage levels of the transmission lines TX_A to TX_D that are all connected to each other in parallel.

As the transceiver 10 according to the exemplary embodiment of the present disclosure modulates the data signal DS into the code information ABCD in the modulation section unit M-UI through the transmitter 100, the transmission bit rate with respect to the data signal DS may be improved. In this case, the transceiver 10 may provide the common mode currents to the transmission lines TX_A to TX_D, respectively, through the transmitter 100, and thus, a common mode level IDC with respect to the transmission lines TX_A to TX_D may be uniformly maintained, thereby minimizing an output noise. In addition, as the transceiver 10 may detect the code information ABCD based on the voltage level of each of the transmission lines TX_A to TX_D through the receiver 200, a separate analog reference voltage is not required.

Hereinafter, the transmitter 100 of FIG. 1 will be described in detail with reference to FIGS. 4 to 8.

Figure 4:
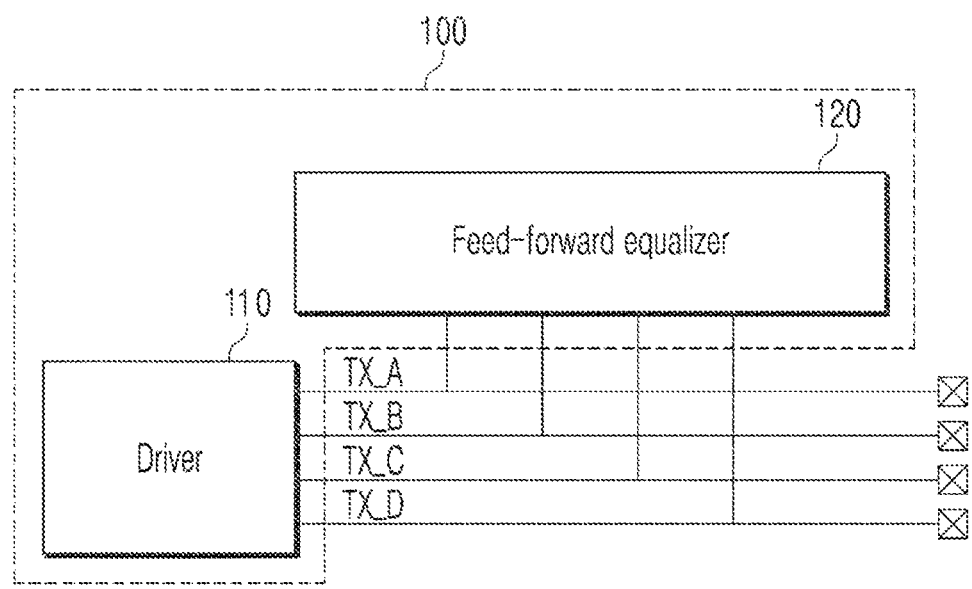
FIG. 4 is a block diagram showing a transmitter.

FIG. 4 is a block diagram showing the transmitter 100.

Referring to FIG. 4, the transmitter 100 may include a driver Ho and a feed-forward equalizer 120.

The driver 110 may be connected to a transmitting end through a plurality of transmission lines TX_A to TX_D. Here, the transmitting end may be connected to the receiver 200.

Then, the feed-forward equalizer 120 may be connected to the driver 110 and the transmitting end through the transmission lines TX_A to TX_D.

Figures 5, 6:
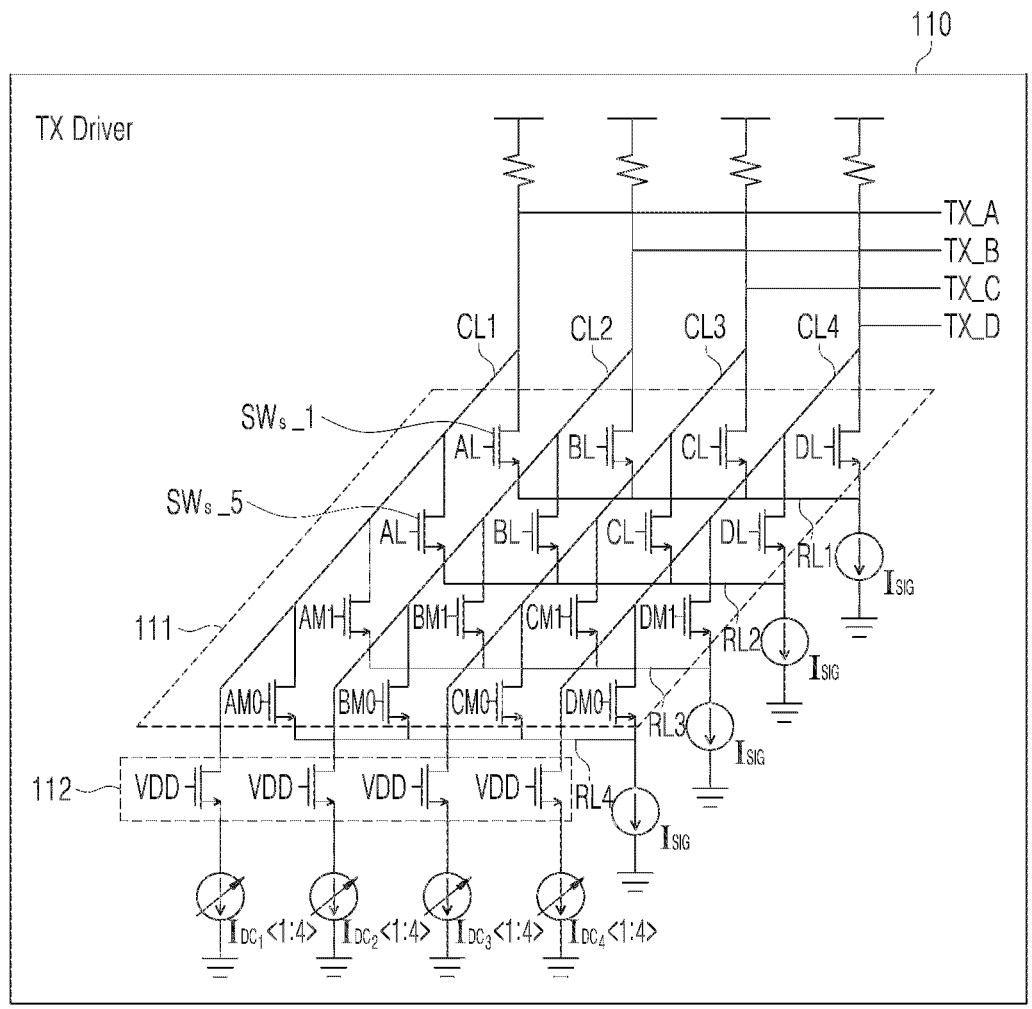
FIG. 5 is a view showing a driver of FIG. 4.
FIG. 6 is a view showing a switching table that is previously set.
Figure 7:
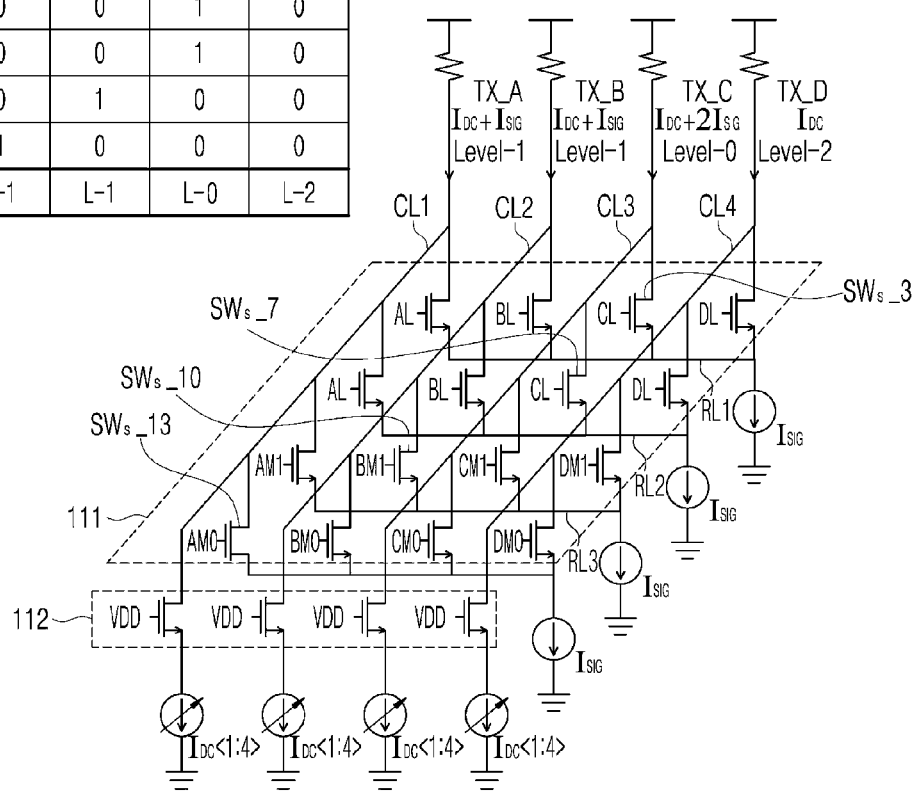
FIG. 7 is a view showing an operation of a first switching unit of FIG. 5.

FIG. 5 is a view showing the driver 110 of FIG. 4, FIG. 6 is a view showing a switching table that is previously set, and FIG. 7 is a view showing an operation of a first switching unit 111 of FIG. 5.

Referring to FIGS. 4 to 7, the driver 110 may include a plurality of column lines CL1 to CL4, a plurality of row lines RL1 to RL4, and first and second switching units 111 and 112.

The row lines RL1 to RL4 and the column lines CL1 to CL4 may be current transmission lines to connect a plurality of signal current sources $I_{SIG1}$ to $I_{SIG4}$ and a plurality of direct current sources $I_{DC1}$ to $I_{DC4}$ to the transmission lines TX_A to TX_D. Here, a plurality of direct current sources may provide the common mode currents described above.

In detail, the row lines $RL_1$ to $RL_4$ may be connected between the transmission lines TX_A to TX_D and the signal current sources $I_{SIG1}$ to $I_{SIG4}$ through the first switching unit 111. In this case, the signal current sources $I_{SIG1}$ to $I_{SIG4}$ may provide substantially the same current as each other.

In addition, the column lines CL1 to CL4 may be connected between the transmission lines TX_A to TX_D and the direct current sources $I_{DC1}$ to $I_{DC4}$ through the first switching unit 111 and the second switching unit 112. In this case, the direct current sources $I_{DC1}$ to $I_{DC4}$ may provide substantially the same current as each other. In the exemplary embodiment, the direct current sources $I_{DC1}$ to $I_{DC4}$ may be variable current sources that are capable of varying the current intensity.

The first switching unit iii may include a plurality of signal switches $SW_{S\_1}$ to $SW_{S\_N}$ to switch-connect the transmission lines TX_A to TX_D and the signal current sources $I_{SIG1}$ to $I_{SIG4}$.

In this case, one end of each of the signal switches $SW_{S\_1}$ to $SW_{S\_N}$ may be connected to one of the column lines CL1 to CL4, and the other end of each of the signal switches $SW_{S\_1}$ to $SW_{S\_N}$ may be connected to one of the row lines RL1 to RL4.

According to embodiments, the first switching unit 111 may switch the signal switches $SW_{S\_1}$ to $SW_{S\_N}$ based on the code information ABCD modulated depending on a previously-set input table.

As shown in FIG. 6, the previously-set switching table may include switching status information for the signal switches $SW_{S\_1}$ to $SW_{S\_N}$.

For example, when the code information ABCD modulated according to the previously-set input table are [1,1,0, 2], the first switching unit 111 may switch the signal switches $SW_{S\_1}$ to $SW_{S\_N}$ based on the previously-set switching table shown in FIG. 7.

In addition, the first switching unit iii may switch on one switch among the signal switches $SW_{S\_1}$ to $SW_{S\_N}$ for each row line.

As shown in FIG. 7, the first switching unit 111 may switch on one signal switch $SW_{S\_3}$ connected to a first row line RL1 among the signal switches $SW_{S\_1}$ to $SW_{S\_N}$, one signal switch $SW_{S\_7}$ connected to a second row line RL2 among the signal switches $SW_{S\_1}$ to $SW_{S\_N}$, one signal switch $SW_{S\_10}$ connected to a third row line RL3 among the signal switches $SW_{S\_1}$ to $SW_{S\_N}$, and one signal switch $SW_{S\_13}$ connected to a fourth row line RL4 among the signal switches $SW_{S\_1}$ to $SW_{S\_N}$.

According to the exemplary embodiment, in the case of the PAM-3 signaling scheme, the first switching unit 111 may switch on two or less signal switches for each column line among the signal switches $SW_{S\_1}$ to $SW_{S\_N}$.

As shown in FIG. 7, the first switching unit 111 may switch on a thirteenth signal switch $SW_{S\_13}$ connected to a first column line CL1, a tenth signal switch $SW_{S\_10}$ connected to a second column line CL2, and a third signal switch $SW_{S\_3}$ and a seventh signal switch $SW_{S\_7}$, which are connected to a third column line CL3, and may switch off all signal switches connected to a fourth column line CL4.

According to another exemplary embodiment, in the case of the PAM-4 signaling scheme, the first switching unit 111 may switch on three or less signal switches for each column line among the signal switches $SW_{S\_1}$ to $SW_{S\_N}$.

The second switching unit 112 may include a plurality of direct current signal switches $SW_{D\_1}$ to $SW_{D\_4}$ to switch-connect the transmission lines TX_A to TX_D and the direct current sources $I_{DC1}$ to $I_{DC4}$.

In this case, one end of each of the direct current switches $SW_{D\_1}$ to $SW_{D\_N}$ may be connected to one of the column lines CL1 to CL4, and the other end of each of the direct current switches $SW_{D\_1}$ to $SW_{D\_N}$ may be connected to one of the direct current sources $I_{DC1}$ to $I_{DC4}$.

In addition, the second switching unit Hz may substantially simultaneously switch on the direct current switches $SW_{D\_1}$ to $SW_{D\_N}$ and may uniformly maintain the common mode level of the transmission lines TX_A to TX_D.

Hereinafter, the feed-forward equalizer 120 will be described in more detail with reference to FIGS. 8 and 9.

Figure 8:
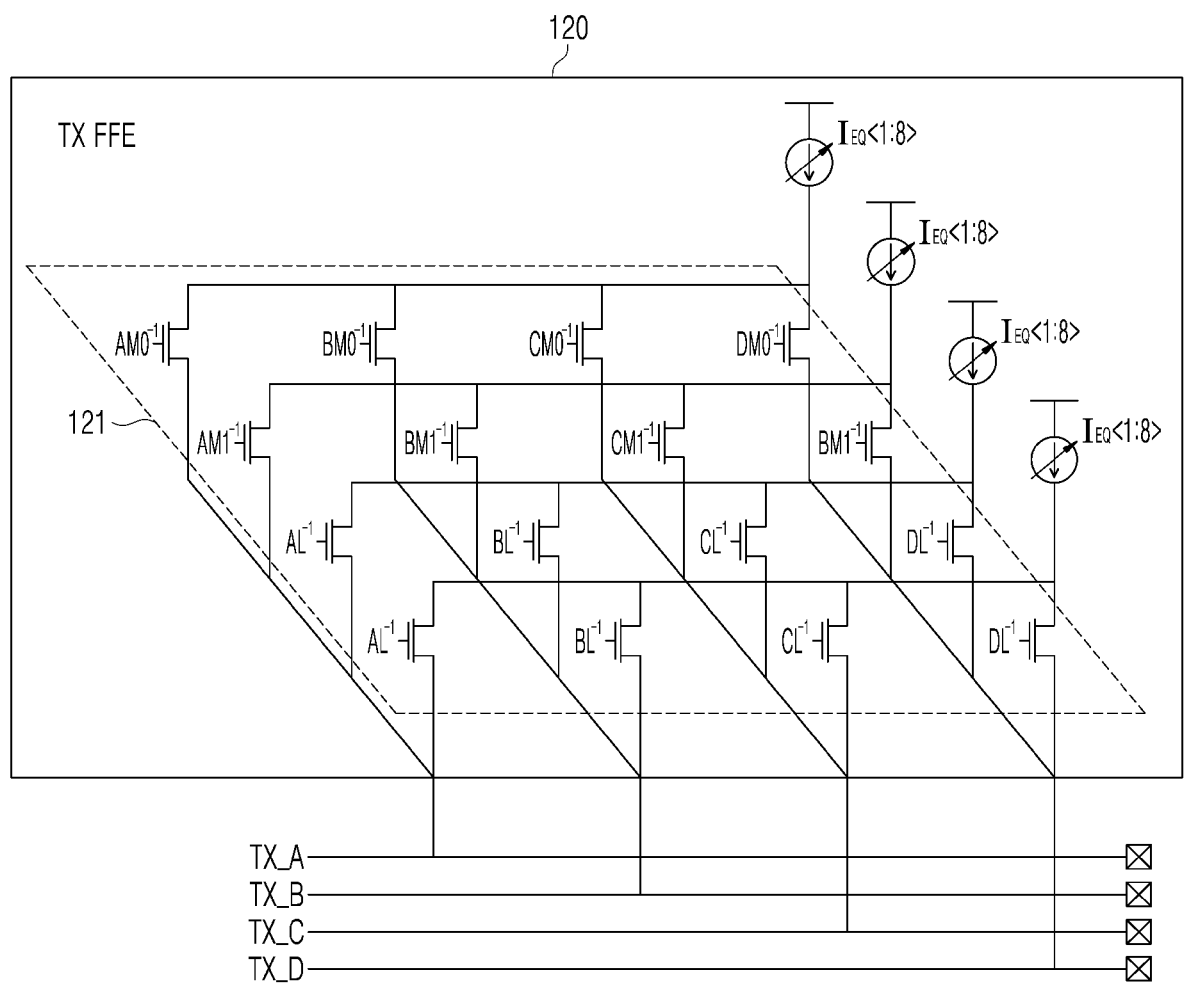
FIG. 8 is a view showing a feed-forward equalizer of FIG. 4.
Figure 9:
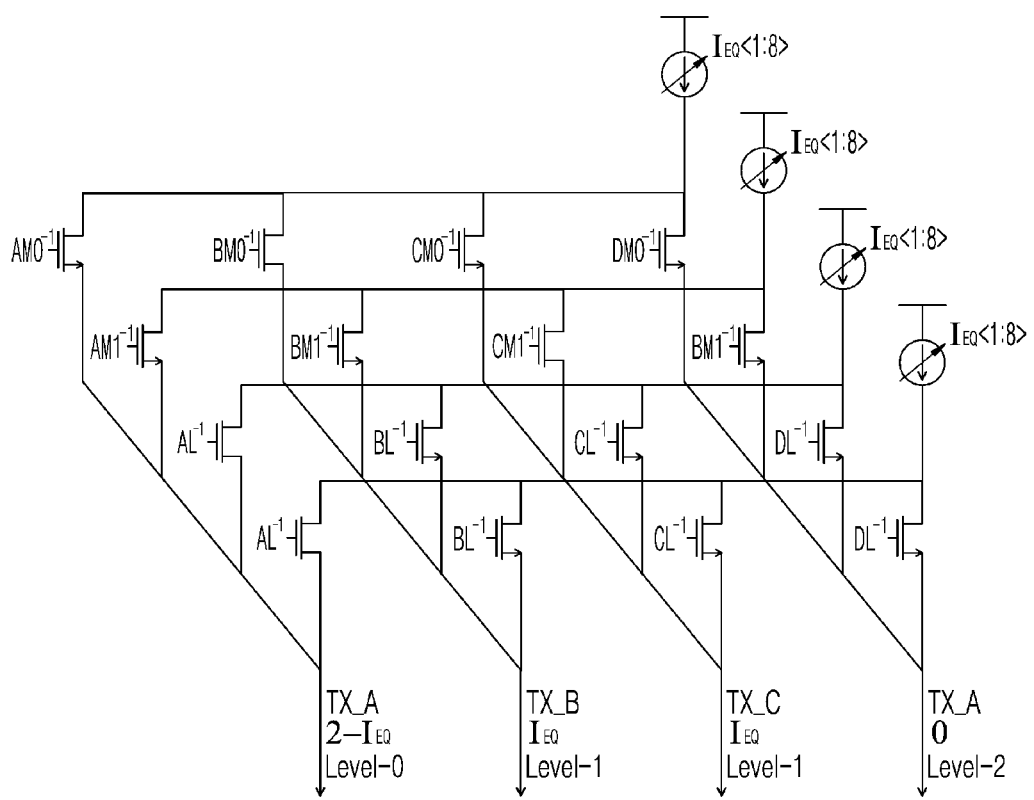
FIG. 9 is a view showing an operation of the feed-forward equalizer of FIG. 8.

FIG. 8 is a view showing the feed-forward equalizer 120 of FIG. 4, and FIG. 9 is a view showing an operation of the feed-forward equalizer 120 of FIG. 8.

Referring to FIGS. 4, 8, and 9, the feed-forward equalizer 120 may include a replication circuit 121 and a plurality of equalizing current sources $I_{EQ\_1}$ to $I_{EQ\_4}$.

The replication circuit 121 may include the same configurations as each of the row lines RL1 to RL4, the column lines CL1 to CL4, and the first switching unit 111.

Hereinafter, since the configurations of the replication circuit 121 may have the same function and operation as those of the row lines RL1 to RL4, the column lines CL1 to CL4, and the first switching unit 111 described with reference to FIG. 5, details thereof will be omitted.

That is, the replication circuit 121 may switch-connect the transmission lines TX_A to TX_D and the equalizing current sources $I_{EQ\_1}$ to $I_{EQ\_4}$ using the same configuration as that of the first switching unit III to remove a post-cursor and a pre-cursor with respect to the transmission lines TX_A to TX_D.

The equalizing current sources $I_{EQ\_1}$ to $I_{EQ\_4}$ may supply currents of the same intensity as each other. In this case, the equalizing current sources $I_{EQ\_1}$ to $I_{EQ\_4}$ may vary the current intensity.

Figure 10:
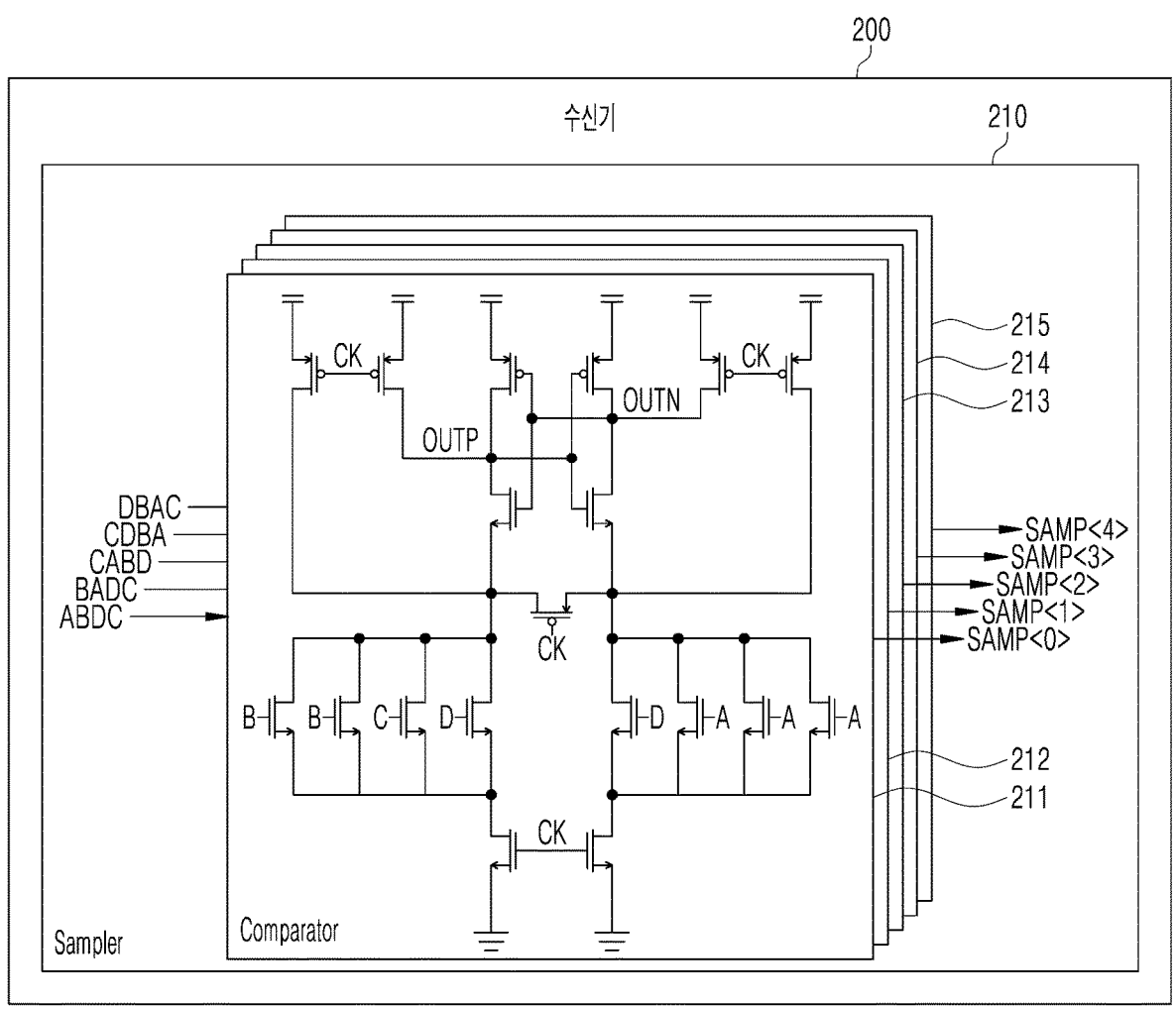
FIG. 10 is a block diagram showing a receiver of FIG. 1.
Figure 11:
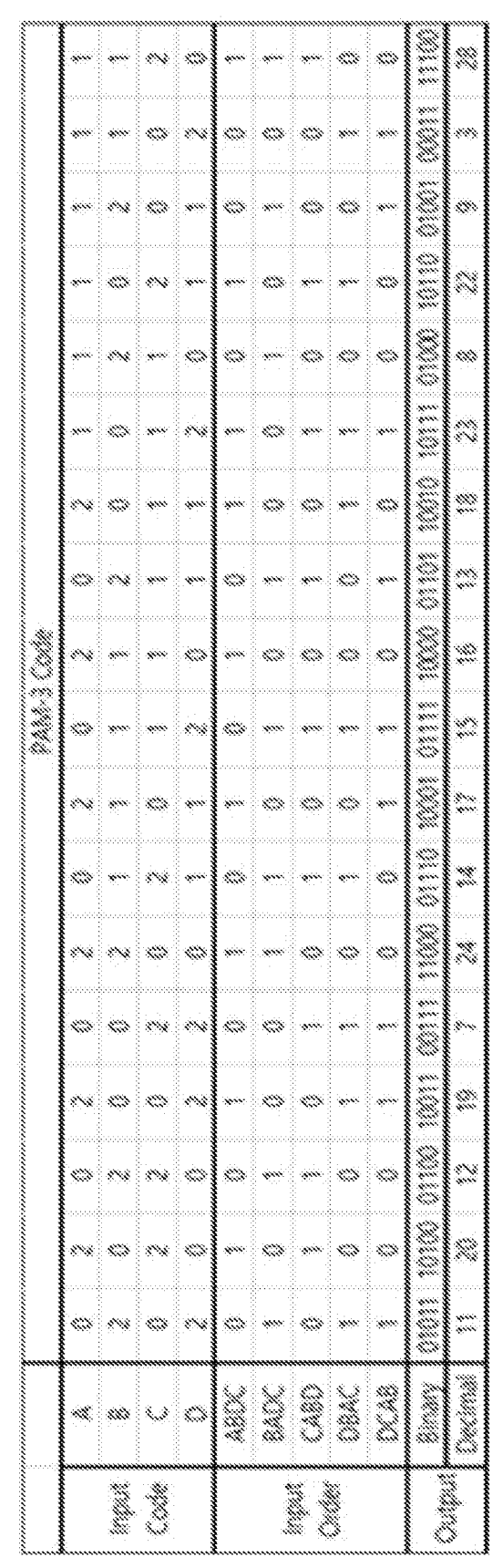

FIG. 10 is a block diagram showing the receiver zoo of FIG. 1, and FIG. 11 is a data table that is processed by a sampler 210 of FIG. 10.

Referring to FIGS. 1, 10, and 11, the receiver zoo may include the sampler 210.

The sampler 210 may sample the code information ABCD modulated through the transmitter 100 as a plurality of input codes ABDC, BADC, CABD, CDBA, and DBAC by arranging the code information ABCD in a predetermined arrangement order.

As shown in FIG. 11, the input codes ABDC, BADC, CABD, CDBA, and DBAC may be codes obtained by changing the arrangement order of the code information ABCD in an arbitrary order.

The sampler 210 according to the exemplary embodiment may include a plurality of comparators 211, 212, 213, 214, and 215 that individually output bit information of the data signal DS based on the input codes ABDC, BADC, CABD, CDBA, and DBAC.

In detail, a first comparator 211 may output first bit information of the data signal DS based on a first input code ABDC among the input codes ABDC, BADC, CABD, CDBA, and DBAC. A second comparator 212 may output second bit information of the data signal DS based on a second input code BADC among the input codes ABDC, BADC, CABD, CDBA, and DBAC. A third comparator 213 may output third bit information of the data signal DS based on a third input code CABD among the input codes ABDC, BADC, CABD, CDBA, and DBAC. A fourth comparator 214 may output fourth bit information of the data signal DS based on a fourth input code CDBA among the input codes ABDC, BADC, CABD, CDBA, and DBAC. In addition, a fifth comparator 215 may output fifth bit information of the data signal DS based on a fifth input code DBAC among the input codes ABDC, BADC, CABD, CDBA, and DBAC.

For example, as shown in FIG. 11, when the code information ABCD are [0,2,0,2], the first input code ABDC is [0,2,2,0], and the first comparator 211 may output zero (0) as the first bit information of the data signal DS based on [0,2,2,0]. In addition, when the code information ABCD are [0,2,0,2], the second input code BADC is [2,0,2,0], and the second comparator 212 may output one (I) as the second bit information of the data signal DS based on [2,0,2,0].

Figure 12:
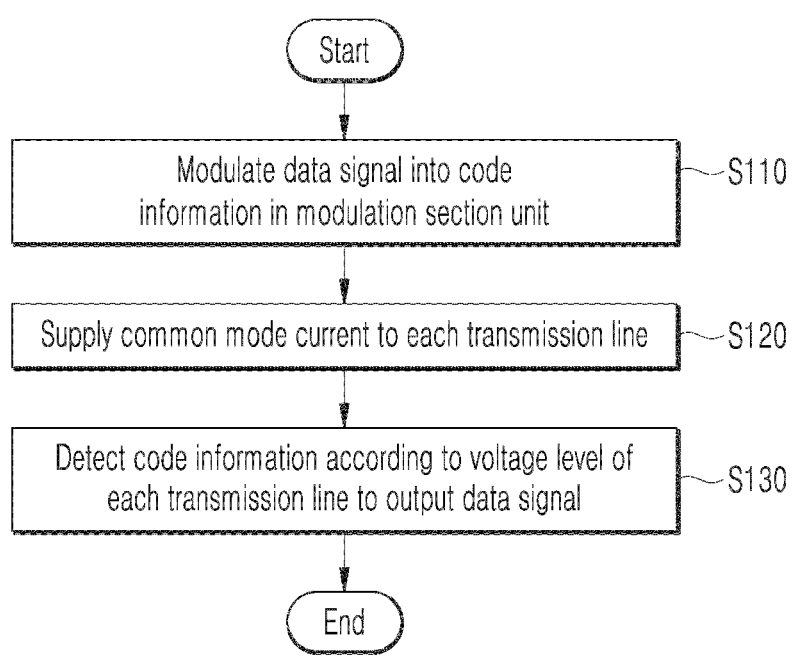
FIG. 12 is a flowchart showing an operation of the transceiver of FIG. 1.

FIG. 12 is a flowchart showing an operation of the transceiver 10 of FIG. 1.

Referring to FIGS. 1 and 12 the transceiver 10 may modulate the data signal DS into the code information ABCD in the modulation section unit M-UI through the transmitter in operation S110.

In this case, the transceiver 10 may individually supply the common mode currents to the transmission lines TX_A to TX_D through the transmitter 100 in operation S120.

The transceiver 10 may detect the code information ABCD according to the voltage level of each of the transmission lines TX_A to TX_D through the receiver zoo and may output the data signal DS in operation S130.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed. Therefore, the disclosed subject matter should not be limited to any single embodiment described herein, and the scope of the present inventive concept shall be determined according to the attached claims.

What is claimed is:

1. A transceiver comprising:
   a transmitter modulating a data signal into code information in a modulation section unit and individually supplying a common mode current to a plurality of transmission lines; and
   a receiver detecting the code information according to a voltage level of each of the transmission lines and outputting the data signal,
   wherein the data signal is in proportion to a number of modulation time units of the modulation section unit.

2. The transceiver of claim 1, wherein a number of the transmission lines is at least two, the transmission lines are provided in even number, and the transmission lines are all connected to each other in parallel.

3. The transceiver of claim 1, wherein the code information comprise at least two modulation codes having different code arrangement for each modulation section unit.

4. The transceiver of claim 2, wherein the data signal is in proportion to a number of modulation codes that are previously mapped according to a parallel connection relationship between the transmission lines.

5. The transceiver of claim 4, wherein the number of the modulation codes that are previously mapped is varied depending on a multi-level signaling scheme.

6. The transceiver of claim 1, wherein the transmitter comprises:
   a driver connected to a transmitting end through the transmission lines; and
   a feed-forward equalizer connected to the driver and the transmitting end through the transmission lines.

7. The transceiver of claim 6, wherein the driver comprises:
   a plurality of row lines;
   a plurality of column lines that connects a plurality of signal current sources and a plurality of direct current sources to the transmission lines together with the row lines;
   a first switching unit that switch-connects the transmission lines and the signal current sources; and
   a second switching unit that switch-connects the transmission lines and the direct current sources.

8. The transceiver of claim 7, wherein the first switching unit comprises a plurality of signal switches in which one end thereof is connected to one of the column lines and the other end thereof is connected to one of the row lines.

9. The transceiver of claim 8, wherein the first switching unit switches the signal switches based on the code information modulated according to a switching table that is previously set, and the previously-set switching table comprises switching status information of each of the signal switches.

10. The transceiver of claim 8, wherein the first switching unit switches on one signal switch among the signal switches for each row line.

11. The transceiver of claim 8, wherein the first switching unit switches on two or less signal switches for each column line among the signal switches under a condition of a PAM-3 signaling scheme.

12. The transceiver of claim 8, wherein the first switching unit switches on three or less signal switches for each column line among the signal switches under a condition of a PAM-4 signaling scheme.

13. The transceiver of claim 7, wherein the second switching unit comprises a plurality of signal switches in which one end thereof is connected to one of the column lines and the other end thereof is connected to the direct current sources.

14. The transceiver of claim 13, wherein the second switching unit substantially simultaneously switches on the signal switches.

15. The transceiver of claim 6, wherein the feed-forward equalizer comprises a replication circuit that comprises a same configuration as the row and column lines and the first switching unit and a plurality of equalizing current sources to remove a post-cursor and a pre-cursor.

16. The transceiver of claim 1, wherein the receiver comprises a sampler that samples the code information as a plurality of input codes by arranging the code information in a predetermined arrangement order.

17. The transceiver of claim 16, wherein the sampler comprises a plurality of comparators that individually outputs bit information of the data signal based on each of the input codes.

18. A method of operating a transceiver, comprising:
modulating a data signal into code information in a modulation section unit to supply a common mode current to a plurality of transmission lines using a transmitter; and
detecting the code information according to a voltage level of each of the transmission lines to output the data signal using a receiver, wherein a number of the transmission lines is at least two, the transmission lines are provided in even number, and the transmission lines are all connected to each other in parallel,
wherein the data signal is in proportion to a number of modulation time units of the modulation section unit.

19. The method of claim 18, wherein the code information comprises at least two modulation codes having different code arrangement for each modulation section unit.

20. A transceiver comprising:
a transmitter modulating a data signal into code information in a modulation section unit and individually supplying a common mode current to a plurality of transmission lines; and
a receiver detecting the code information according to a voltage level of each of the transmission lines and outputting the data signal,
wherein the data signal is in proportion to a number of modulation codes that are previously mapped according to a parallel connection relationship between the transmission lines, and
wherein the number of the modulation codes that are previously mapped is varied depending on a multi-level signaling scheme.

* * * * *